United States Patent [19]

Hasenbalg et al.

[11] 4,156,915

[45] May 29, 1979

[54] FONT GENERATING SYSTEM

[75] Inventors: Ralph D. Hasenbalg, Canoga Park; Richard L. Durrett, Los Angeles, both of Calif.

[73] Assignee: Vector General, Inc., Woodland Hills, Calif.

[21] Appl. No.: 782,068

[22] Filed: Mar. 28, 1977

[51] Int. Cl.[2] .......................... G06F 3/14; G06J 1/00; H01J 29/70

[52] U.S. Cl. .................................... 364/521; 315/367; 364/607; 364/855

[58] Field of Search ............... 364/521, 607, 742, 752, 364/814, 855, 718; 340/324 A; 315/364, 367, 370, 371, 383-383, 30

[56] References Cited

U.S. PATENT DOCUMENTS

| | | | |
|---|---|---|---|
| 3,047,851 | 7/1962 | Palmiter | 340/324 A |
| 3,706,906 | 12/1972 | Koussa et al. | 340/324 A X |
| 3,713,134 | 1/1973 | Chaney | 340/324 A X |
| 3,772,563 | 11/1973 | Hasenbalg | 364/855 X |
| 3,772,676 | 11/1973 | Conley | 340/324 A |
| 3,810,165 | 5/1974 | Rosenthal | 340/324 A |

*Primary Examiner*—Joseph F. Ruggiero

*Attorney, Agent, or Firm*—Elwood S. Kendrick; Patrick F. Bright

[57] ABSTRACT

A character display system which generates analog signals to write sequentially specified strokes forming a character on a display device is described. The character strokes are stored as digital words in a Read Only Memory (ROM) and are sequentially read out in response to instructions to write a specified character. The ROM also contains address words that specify a group of words elsewhere in the ROM that together constitute the instructions for writing the character designated. The address words include fields controlling incrementing within the addressed word group, movement on the display device to a new character space, and positioning of the character space on that display device. Each word in a character word group includes fields representing the X- and Y-end points of the stroke signal, the slope of the X- and Y-components, the blanking and unblanking of the stroke signal, and, in some cases, a pause in movement where a change in slope occurs during execution of a single word. The system permits displacement of the X- and Y-end points in X-, Y- and Z- planes for display on an X-Y coordinate display means. The system also permits modifying the scale of a character, rotating a character in 90° increments, slanting a character, and any combination of displacement, modification, 90° incremental rotation and slanting.

21 Claims, 6 Drawing Figures

FONT GENERATING SYSTEM

The invention relates to a high speed analog font generator system for drawing characters on a display device such as a cathode ray tube. The system utilizes a stroke technique, forming characters by drawing a series of straight line segments on the display device. A Read Only Memory in the system is addressed by ASCII (American Standard Code for Information Interchange) character code or other suitable codes received from an input source. Digital words stored in the ROM include address words specifying the word group for the character selected. Digital words in character word groups include fields specifying the X- and Y-end point and the slopes of the X- and Y-components of the stroke the word represents.

The font generating system receives certain digital signals from input means, and derives therefrom X-deflection, Y-deflection and intensity control analog signals and a blank/unblank digital signal to draw a character on a display device. In the preferred embodiment, input digital signals include: (1) bits that generate appropriate clocks to load associated data bits into registers; (2) data bits which may represent a character code, character scale, X-, Y- and Z-plane modifications, slant and 90° rotation, or a combination of two or more of the foregoing; (3) digital velocity signals representing the speed at which the character is drawn on the display device; (4) digital signals indicating to the input and other devices that data is being or has been transferred to the system and (5) a digital signal generated after data transfer from input to the system begins indicating the input lines are stable.

The system produces several digital analog outputs including: (1) X- and Y-deflection analog signals; (2) a signal representing the velocity at which the character is drawn on the display device and used for intensity control; (3) an unblank signal that enables the intensity of the X- and Y-deflection analog signals to produce a visible stroke on the display device; (4) busy signals that inhibit character spacing on the display device during a character draw; and (5) a digital acknowledge signal from the system to the input device to indicate that data transfer is complete.

The means for storing a plurality of address words and a plurality of character word groups may be, and in the preferred embodiment is, a Read Only Memory. Each address word includes in coded form a field specifying the address of a specific character word group within the ROM, each group defining at least part of one character, each word defining one stroke in a character part, and includes fields that: specify whether there is to be a move to a new character position after the draw of the specified character; control positioning of the current character space on a display device; specify, where desired, whether the character is to be a subscript or superscript; specify, where desired, reduction to two-thirds normal character size (where subscript or superscript is specified, reduction to two-thirds normal character size is automatic); and specify whether character size changes, character position changes, or both.

Each word within the character word group includes fields specifying in coded form, for the stroke signal the word represents, the X-end point, the Y-end point, the slope of the X-component, the slope of the Y-component, intensity (blanked or unblanked) of the stroke signal, word group termination (where appropriate, and, where necessary, a pause in deflection where a change in slope of the X-component, Y-component, or both, takes place during generation of the stroke signal. In the preferred embodiment, the X-end point is specified by a five bit field; the Y-end point, by another five bit field; slope, by a three bit field; intensity, by a single bit; termination of the draw by one bit; and the pause where slope changes, by another bit.

As an example if the input device specifies the drawing of the letter "R", the address word 052(hex notation) is fed to the ROM. The digital word stored at this address is 101000, together with the address of the word group for the character "R", namely 087(hex notation). The 1 or high bit in the first position specifies movement to a new character position after completing the draw of the character "R". The 0 or low bit in the second position specifies the starting point for the character space for the character "R" on the display device. The 1 or high bit in the third position specifies that the drawing of the character "R" does not terminate with the first word in the "R" word group containing a terminate bit. Rather, "R" terminates with the second word in this word group that contains a terminate bit. The next two bits may be used to determine whether the character "R" is normal or reduced in size, and, where reduced, whether the character is in a normal, subscript or superscript position. However, these two bits are not utilized in this address word because the sixth bit (the enable bit) is low. This low enable bit dictates that the character size/character position bits are not enabled. If the enable bit in the address word were high, as it cound be in other embodiments of this system, the character size/character position bits could then activate means for selecting the character size and position desired.

In the coding of this ROM, character size and character position are selected by words stored in the ROM that control these functions, but do not draw characters. These words include a multi-bit (here, two bits) command field that specifies whether the character word is normal or reduced in size, and, where reduced in size, whether the character position is normal, subscript or superscript. These words also include a single-digit enable bit. When true, this bit permits a change in character size, position, or both, depending on the data controlling character size and position. Because these character size/character position command words are separate from the character words, a change in character size, position, or both, once enabled, may be maintained throughout the draw of one or more character parts thereafter selected, if desired. Since character words or command words in the ROM control character size and position and changes in size and position, since the ROM may be configured as desired, and since one ROM may readily be replaced with another that is differently configured, the means for receiving, transmitting and changing character size and position outside the ROM need not change, which greatly increases the flexibility of this system.

As hereafter described, the first word in the word group for the character "R" is accessed, and each succeeding word in the word group is incrementally accessed and applied to means to generate the X- and Y-deflection analog signals to produce a stroke on the display device. For the character "R", the character word group includes six words as follows:

| | X-end point | Y-end point | Slope | Intensity | Termi-nate | Inhibit Roundoff |
|---|---|---|---|---|---|---|
| 1st word | 01010 | 11011 | 100 | 1 | 0 | 0 |
| 2nd word | 10011 | 11011 | 100 | 1 | 0 | 0 |
| 3rd word | 10110 | 10101 | 011 | 1 | 0 | 1 |
| 4th word | 01010 | 10010 | 011 | 1 | 1 | 1 |
| 5th word | 10010 | 10010 | 100 | 0 | 0 | 0 |
| 6th word | 10101 | 01001 | 111 | 1 | 1 | 0 |

The first five bits, under the heading "X-End Point", specify the X-end point of the stroke signal. The second five bits, under the heading "Y-End Point", specify the Y-end point of the stroke signal. The next three bits, under the heading "Slope" specify upon decoding, the slope of the X-component and Y-component of the stroke. The last three bits indicate, respectively, whether the beam is to be blanked (intensity bit is high) or unblanked (intensity bit is low); whether the character is to terminate with that word (terminate bit is high) or not (terminate bit is low); and finally, where the slope changes during the stroke draw, a pause (inhibit roundoff bit is high) in the draw where the slope changes.

The five bit fields for each of the X- and Y-end points limit the range for X and Y from 0 to 31, and thus limit the character space to a 32 by 32 matrix consisting of 1,024 programmable points for character draws. In the preferred embodiment, each bit in the font generating system represents 10 bits on the X/Y (two-dimensional) display device. Thus, one character space on the display device occupies a total of 310 by 310 raster units on that device. The draw begins from the position where X is 10, Y is 9. At that position, the X and Y deflection voltages are zero. These voltages vary 0.1 volt per bit, as shown below:

| | |
|---|---|
| Full scale X (plus) | +2.1V |
| Full Scale X (minus) | −1.0V |
| Full scale Y (plus) | +2.2V |
| Full Scale Y (minus) | −0.9V |
| Parking position (starting position for most Characters) | OV X, OV Y |

Because the field for the slope comprises three bits, eight slopes are possible upon decoding, including:

| Slope Field | Corresponding Slope |
|---|---|
| 000 | 1Y/3X |
| 001 | 1Y/2X |
| 010 | 2Y/3X |
| 011 | 1Y/1X |
| 100 | 3Y/3X |
| 101 | 3Y/2X |
| 110 | 2Y/1X |
| 111 | 3Y/1X |

The first word in the word group for the character "R" includes a five bit field, namely 0.1010, specifying the X-end point at 10, and a five bit field, namely 11011, specifying the Y-end point of this stroke at 27. Upon decoding, the slope field, namely 100, specifies a slope of 3Y/3X. The intensity bit is high, indicating that the beam will be unblanked during this first stroke. The terminate bit is low, indicating that the character does not end with this stroke. Therefore, the next word in the group will be accessed in drawing the character. The pause or inhibit roundoff bit is also low, indicating no change of slope during the stroke and no need to pause.

The second word in the character "R" specifies a move from X10, Y27 (the end point of the first word) to X18, Y27. Again, the slope is 3Y/3X, the intensity bit is high, and the terminate and inhibit roundoff (pause) bits are both low. (The pause bit is also called the inhibit roundoff bit because the pause prevents formation of round corners in the displayed character where slope changes).

The following word specifies a draw to X22, Y21 from the last end point, namely X19, Y27, which represents a change of 3X and 6Y, or a slope of 2Y/1X, if a straight line were drawn to that point. However, the slope field 011 specifies a slope of 1Y/1X. This commands the X and Y integrators in the deflection channels to drive at the same velocity, which produces a stroke to X22, Y24 (intensity bit is high). At this time, movement in the X-direction ceases. However, movement in the Y-direction continues until the end point X22, Y21 is reached. The inhibit roundoff signal prevents formation of a curved line at X22, Y24, where slope changes, by signaling a pause in movement. This permits the integrating circuit to settle and to draw a straight line from that point to the end point.

The next word specifies the same slope, 1Y/1X, to the end point X10, Y18, and again the inhibit roundoff bit is high, which signals a pause at the point X18, Y18, where slope changes. In this word the terminate bit is high, and that would ordinarily terminate the drawing of the character at this point. However, because the address word contains a bit specifying that this first terminate bit is to be skipped, drawing of the character "R" continues.

In the fifth word, where the intensity bit is low, the beam is blanked, and the X and Y coordinates and slope simply require movement to the point X18, Y18. From there, the sixth and final word specifies a draw (intensity bit high) to the end point X21 Y9, at a slope of 3Y/1X. The high terminate bit in this word signals the end of the character, and a field from the address word signals movement of the beam to the starting point X10, Y9. Simultaneously, the spacing bit in the address word signals movement to the next character space.

The font generating system includes means for scaling of characters from full positive scale through zero to a full negative scale. Scaling is effected in response to a digital data field from the input source representing the scale desired. This digital scale data is clocked to a multiplying digital to analog converter whose output is amplified and applied equally to the X- and Y-deflection analog signals. The X- and Y-deflection signals include the X-end point, Y-end point and the slope of the X-component and the Y-component.

The system also includes means for drawing slanted characters, and means for rotating characters in 90° increments. In combination, these means provide for drawing slanted characters rotated in one or more 90° increments. In the preferred embodiment, the means for rotating characters in 90° increments are switches which direct the X-deflection analog signal to the Y-output circuit and the Y-deflection analog signal to the X-output circuit. Means for slanting characters include resistors and switches which are controlled by digital inputs from the input source specifying whether slant, rotation or both are desired.

The font generating system also provides means for displacing characters in X-, Y-, and Z-planes, and for displaying such displaced characters on two-dimensional display devices such as a CRT. In the preferred embodiment, the system includes means for generating analog signals specifying the X-component (X-end point/X-slope) and Y-component (Y-end point/Y-slope) of each stroke, and means for generating two digital signals for modifying the X-component, two for modifying the Y-component. In response to clock pulses, four separate register means receive and transmit the four modifying signals to means for converting them from digital to analog.

One X-component modifying analog signal is applied to means for multiplying the X-component analog signal therewith. The first Y-component modifying analog signal is applied to means for multiplying the Y-component analog signal therewith. Then the modified X-component and Y-component analog signals are summed to produce an X-deflection output analog signal.

To produce the Y-deflection output analog signal, the second Y-component modifying analog signal is applied to means for multiplying the Y-component analog signal therewith, the second X-component modifying signal is applied to means for multiplying the X-component analog signal therewith, the two multiplications are effected, and the product signals pass to means for summing them. In the preferred embodiment, the scale analog signal is combined with the X-component and Y-component modifying signals in the multiplying digital to analog converters. The scale analog signal is applied to all four such converters as a reference signal so that the X-component and Y-component signals are all adjusted to the same scale. The X-deflection and Y-deflection output analog signal applied to the display means, then, may be represented by the following equations.

X-deflection output analog signal=(X-component (first X-component modifying signal) (scale)+(Y-component) (first Y-component modifying signal) (scale)

Y-deflection output analog signal=(Y-component) (second Y-component modifying signal) (scale)+(X-component) (second X-component modifying signal) (scale)

In the preferred embodiment, the digital data representing the two X-component and the two Y-component modifying analog signals are computed as follows:

First X-component modifying signal=K(cos Y ROT) (cos Z ROT)

Second X-component modifying signal=K(cos Y ROT) (sin Z ROT)

First Y-component modifying signal=K(sin X ROT) (sin Y ROT) (cos Z ROT)+(cos X ROT) (sin Z ROT)

Second Y-component modifying signal=K(sin X ROT) (sin Y ROT) (sin X ROT)+(cos X ROT) (cos Z ROT)

where K is the final scale factor, and ROT is the angle of rotation about the specified axis.

These are simply examples of the many different approaches to computing modification signals for representing character movement in X-, Y- and Z-planes on a two dimensional display device.

The system may also include means for control of the polarity of the X- and Y-deflection signals. In the preferred embodiment, these polarity signals are produced by combining two 90° rotation digital signals, the scale register sign bit, and the X-modifying and Y-modifying signal register sign bits. Decoding of the 90° rotation signals is as follows:

| Data[1] | Data[1] | Data[1] | 1st Rotation Signal | 2nd Rotation Signal | Rotation Produced |
|---|---|---|---|---|---|
| 1 | 0 | 0 | 0 | 0 | none |
| 1 | 0 | 1 | 0 | 1 | 90° |
| 1 | 1 | 0 | 1 | 0 | 180° |
| 1 | 1 | 1 | 1 | 1 | 270° |

[1]From input device where the data values for the scale and X- and Y-modification registers are all positive, the sign bits for each of these transformation registers are high. If the data values are all negative, the sign bits are low. The least significant bit in each register will always be the inverse of the sign bit. The polarity signal applied on channel 251 (see FIG. 5) is the product of the scale modification sign bit, the first X-modification sign bit, and the decoded 90° rotation bits. Thus, the polarity signal will be low where 90° rotation is zero or 270° and all signs are alike, and where 90° rotation is 90° or 180° if signs differ. Conversely, the signal will be high where 90° rotation is zero or 270° and the signs differ, and where 90° rotation is 90° or 180° and all signs are alike. Polarity signals for each of the other three multipliers are similarly derived.

The system also includes means for generating a deflection velocity voltage which is applied to the intensity channel in the display device. The deflection velocity voltage produces an output whose intensity is proportional to the slope, 90° incremental rotation, scale, and X-, Y- and Z-plane deflections of the stroke for which the deflection velocity is selected.

In the preferred embodiment, the deflection velocity voltage means includes means for developing an X-deflection velocity voltage, means for producing a Y-deflection velocity voltage, and means for producing a signal that approximates the root mean square (RMS) of these two deflection velocity voltages.

Means for deriving the X-deflection velocity voltage includes: means for deriving an analog X-velocity signal from digital data defining the X-slope of a stroke to appear on the display device, means for deriving an analog Y-velocity signal from digital data defining the Y-slope of the same stroke; means for multiplying the analog X-velocity signal by a first X-end point/X-slope modifying signal and by an analog scale signal to produce a modified X-velocity signal; means for multiplying the analog Y-velocity signal by a first Y-end point/Y-slope modifying signal and by the same analog scale signal to produce a modified Y-velocity signal; means for producing the sum of the analog modified X-velocity signal and the analog modified Y-velocity signal; and means for producing the absolute magnitude of this sum.

The means for deriving the Y-deflection velocity voltage includes means for multiplying the analog X-velocity signal by a second X-end point/X-slope modifying signal and by the analog scale signal to produce a second modified X-velocity signal; means for multiplying the analog Y-velocity signal by a second Y-end point/Y-slope modifying signal and by a scale signal to produce a second modified Y-velocity signal; means for producing the sum of the second analog modified X-velocity signal and the second analog modified Y-velocity signal; and means for producing the absolute magnitude of said sum.

The X-deflection velocity voltage and Y-deflection velocity voltage so obtained are then passed to means for producing an analog signal approximating the root mean square of these two voltages to produce a single X/Y-deflection velocity voltage. The means for deriving the root mean square of the two signals includes, in the preferred embodiment, a resistor network that combines the larger of the X-deflection velocity voltage and Y-deflection velocity voltage with one third of the smaller of the two. The X/Y deflection velocity voltage is then equal to the sum of the larger of the two plus one third of the smaller, all multiplied by a constant.

Referring now to the drawings.

Figure 1:
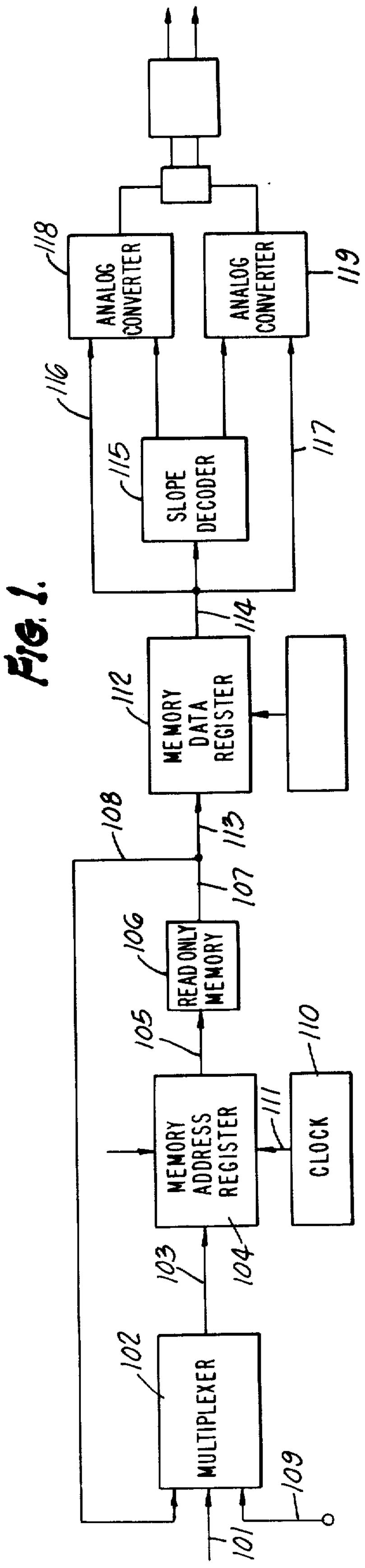
FIG. 1 is a functional block diagram showing the path taken by data specifying the X-end point, Y-end point, X slope and Y slope in the font generating system of the invention.

Referring now to FIG. 1, digital data representing the address word of the selected character passes from an input device (not shown) via path 101 to multiplexer 102. From there, the address word passes to memory address register 104 along path 103 upon receipt of a clock pulse from clock 110 along path 111. Register 104 feeds this address to Read Only Memory (ROM) 106 via path 105, and the address of the first word in the selected character word group is transmitted via paths 107 and 108 to multiplexer 102. Other data in the address word are applied to appropriate means for specifying whether there is to be a move to a new character space upon completing the current character draw, means for specifying the starting X, Y coordinates for the current character, means for effecting termination of the draw, means for skipping one or more terminate bits in the word group specifying the character, means specifying whether the character is normal in size or reduced to two-thirds normal size, and means for controlling whether the character is normal, subscript or superscript. Data path 101 is switched off during this recycle by a busy signal applied to multiplexer 102 via path 109. Clock 110 applies an appropriate pulse via path 111 to memory address register 104, which then receives the address of the first word of the selected character word group.

The address of the first word in the character word group passes in steady state to ROM 106 via path 105, which loads that first address word into the character memory data register 112 via path 113. The next pulse from clock 110 to register 104 via path 111 increments the ROM address from the first word in the character word group to the next word in that group. The next pulse increments the ROM address from the second word in the group to the third word, and this process continues until the ROM word reached includes a terminate bit that is not inhibited by a control bit in the address word.

From the memory data register, the digital field representing the slope of the word passes via path 114 to slope decoder 115. The digital field representing the end point passes to digital to analog converter 118 via path 116. The digital field representing the X-end point passes to digital to analog converter 119 via path 117. Decoder 115 decodes the slope field into two digital fields, one representing the X-slope, the other, the Y-slope. The decoded Y-slope is then converted from digital to analog, and combined with the Y-end point analog signal to produce an analog signal representing the Y-end point/Y-slope of the stroke the character word represents. Similarly, the decoded X-slope is converted from digital to analog, and combined with the X-end point analog signal to produce an analog signal representing the X-end point/X-slope of the stroke the character word represents.

Figure 3:
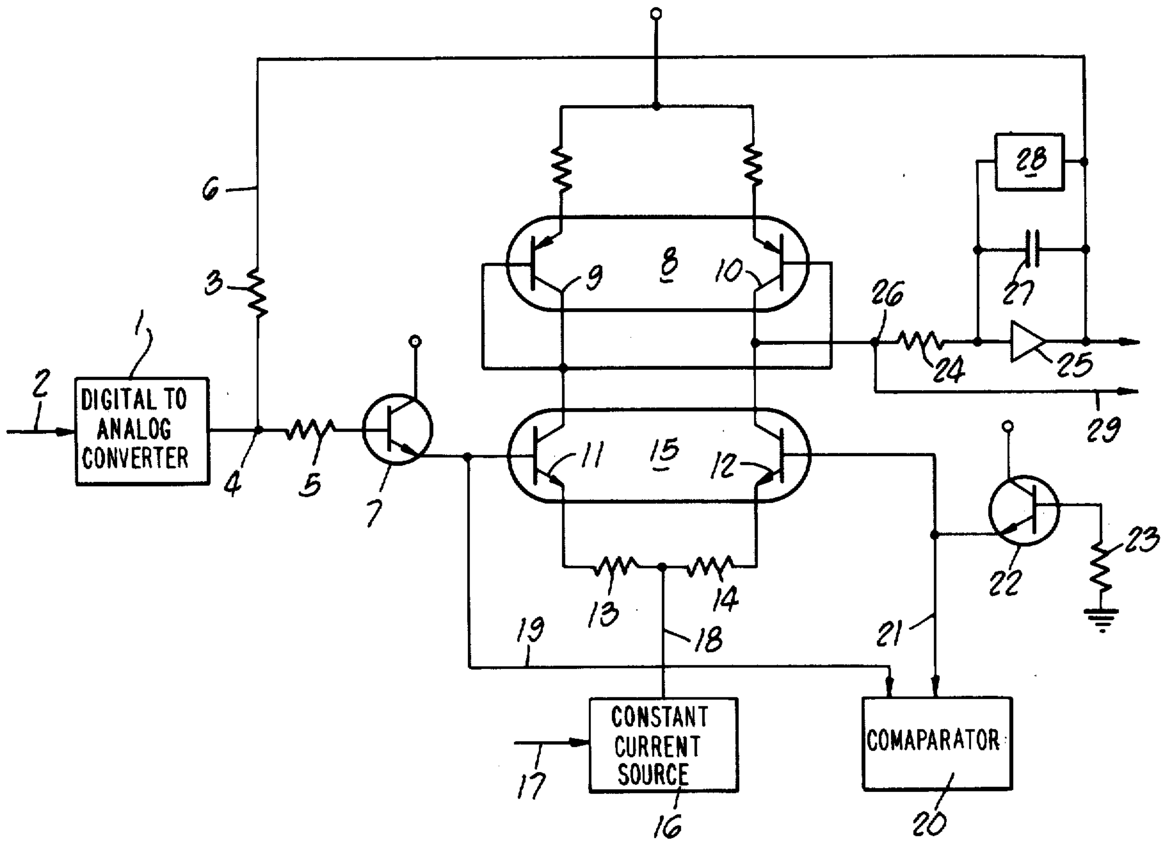
FIG. 3 illustrates in greater detail the conversion from digital to analog of data specifying the X- and Y-end points and slopes.

FIG. 3 shows some detail of this process. There, the digital data representing the Y-end point passes via path 2 to digital to analog converter 1, which produces an analog signal representing the Y-end point. The Y-end point analog signal passes through resistor 5 and is applied to the base of transistor 7. If the signal is positive, the emitter of transistor 7 rises, and is applied as a forward bias to transistor 11.

After a brief period, say 50 nanoseconds, during which a positive pulse is applied to the emitters of transistors 11 and 12, the collector of transistor 9 drops, and, in turn, forward biases transistor 10, which permits current flow through resistor 24 to amplifier 25 and to integrating capacitor 27. The analog signal representing the Y-slope is applied through a transistor network along path 17 to constant current source 16, which produces a corresponding current via path 18 through resistor 13 (where the output is negative going), transistors 11, 9 and 10 and on path 26 to integrating capacitor 27. The output of amplifier 25 goes negative during integration and is fed back to node 4. When node 4 goes negative enough to bring the voltage at node 4 to zero, a closed loop condition exists, and integration ceases. As the integrator output reaches the specified Y-end point, conduction through transistors 11 and 12 again becomes equal. Comparator 20 reads this condition via paths 19 and 21, and produces a digital signal indicating that Y-deflection is complete. A similar network effects the decoding, conversion and integration of the X-end point/X-slope data. When digital signals indicating both X- and Y-deflection are complete, a signal is generated to increment the ROM address to the next word in the word group to execute the next stroke in the character selected.

Figure 4:
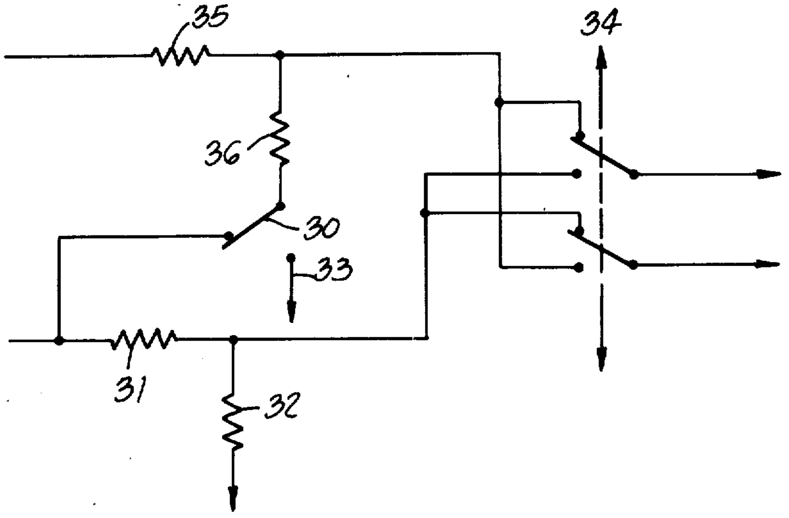
FIG. 4 shows the resistor/switching network for effecting character rotation in 90° increments, formation of slanted characters, or both.

Referring now to FIG. 4, the X-component and Y-component analog signals applied thereto, which would otherwise produce unslanted, unrotated X- and Y-deflection, may be modified to produce slanted characters, unslanted characters rotated in 90° increments, or characters which may be both rotated and slanted. Characters may be rotated in 90° increments in response to a rotation digital signal applied across path 34 to switch the X-deflection analog signal to the Y-deflection path, and the Y-deflection analog signal to the X-deflection path. Where 90° incremental rotation requires a change in polarity of the X-deflection and Y-deflection analog signals, the decoded digital input data specifying such rotation also specifies inversion of polarity. Slanting is effected by closing switch 30 to add a portion of the Y-deflection analog signal through resistors 35 and 36 to the X-deflection analog signal, and then passing the combined signal to the X-deflection path.

Figure 2:
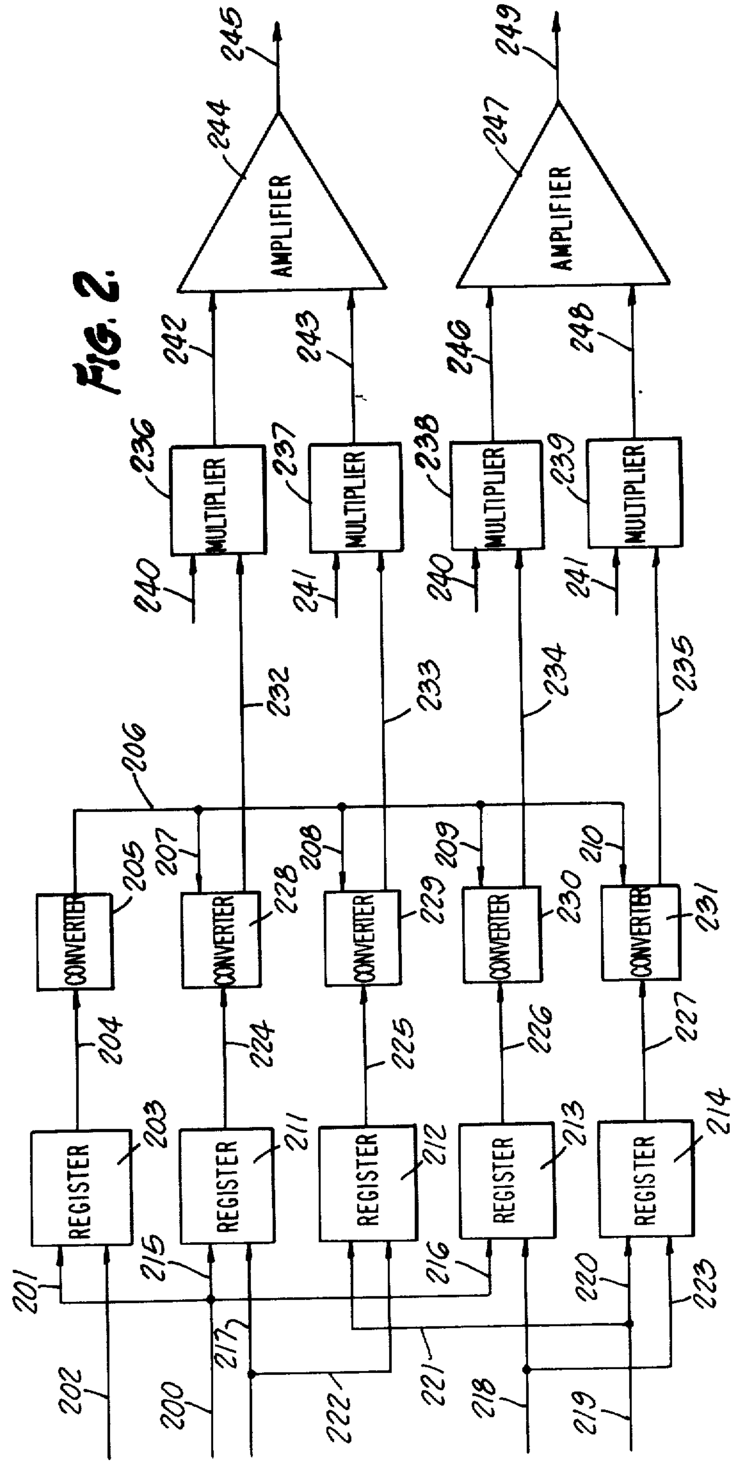
FIG. 2 is a functional block diagram showing the path taken by data specifying the scaling and deflection in the X-, Y- and Z-planes of the X- and Y-deflection signals.

Referring now to FIG. 2, digital data representing the scale of the selected character is advanced on data paths 200 and 201 to register 203 in response to a digital clock pulse applied to register 203 via path 202. The digital data passes from register 203 via path 204 to digital to analog converter 205 to generate an analog scale signal. That signal is applied equally to the X-deflection and Y-deflection signals that produce a move or draw that constitutes part of the selected character. Character scale may range from zero to a maximum positive value of from zero to a maximum negative value. Because the output from register 205 must always be positive, bit juggling is performed at the input to register 205. Bit juggling is performed as follows:

(a) All magnitude bits in the digital scale field are shifted to the left one position before loading into the register;

(b) The sign bit is loaded into the least significant register bit position;

(c) If the input scale is negative, all bits are 1's complemented before loading into the other register positions;

(d) If the input scale is positive, the bits are loaded, uncomplemented, into the other register positions; and (e) If the input scale is negative, the output polarity is inverted, as explained later.

Converter 205 preferably consists of an eight-bit multiplying digital to analog converter linked to an operational amplifier. The analog scale output of the amplifier may be applied directly to the X-deflection and the Y-deflection analog signals to obtain the same scale in both deflection channels. Alterantively, as shown in FIG. 2, the scale analog signal may first be applied to and combined with signals for modifying the X-component and Y-component analog signals in X-, Y-, and Z-planes and for displaying the signals on a two-dimensional display means.

Referring again to FIG. 2, digital data with the same bit juggling as applied to the scale data, representing modification of the X-deflection analog signal and of the Y-deflection analog signal enter registers 211 and 213, respectively, in response to digital clock pulses applied to registers 211 and 213 via paths 217 and 218, respectively. Similarly, other digital data representing modification of the same X- and Y-deflection analog signals are loaded into registers 212 and 214, respectively, via paths 219/221 and 219/220, respectively, in response to digital clock pulses applied to registers 212 and 214 via paths 217/222 and 218/223, respectively.

Data from registers 211, 212, 213 and 214 are applied to digital to analog converters 228, 229, 230 and 231, respectively, via paths 224, 225, 226, and 227, respectively. The analog scale signal from converter 205 is similarly applied to converters 228, 229, 230 and 231 over paths 206/207, 206/208, 206/209 and 206/210, respectively. The analog signals from converters 228 and 229 pass via paths 232 and 233, respectively, to multipliers 236 and 237, respectively. The unmodified X-deflection analog signal is also applied to multiplier 236 via path 240, and the unmodified Y-deflection analog signal, to multiplier 236 via path 241. These unmodified signals may be those from the circuitry shown in FIGS. 1, 3 and 4.

Multiplier 236 multiplies the unmodified X-deflection signal by the first X-modifying analog signal, applied via path 232, and multiplier 237 multiplies the unmodified Y-deflection analog signal by the first Y-modifying analog signal applied via path 233. The outputs of multipliers 236 and 237 are applied to amplifier 244 via paths 242 and 243, respectively, and the sum of the two is the X-deflection output analog signal applied to the X/Y display means via path 245.

Similarly, the second X-modifying and second Y-modifying analog signals from converters 230 and 231, respectively, pass via paths 234 and 235, respectively, to multipliers 238 and 239, respectively. In multiplier 238, the unmodified X-deflection analog signal is multiplied by the second X-modifying signal applied via line 234, and the product signal passes via path 246 to amplifier 247. The second Y-modifying signal from converter 231 passes via path 235 to multiplier 239, and there is multiplied by the unmodified Y-deflection analog signal. The product signal passes via path 248 to amplifier 247, where the second modified Y-deflection output signal and the second modified X-deflection output signal are summed and amplified to produce the Y-deflection output. That analog signal is applied to the X/Y display means via path 249.

Figure 5:
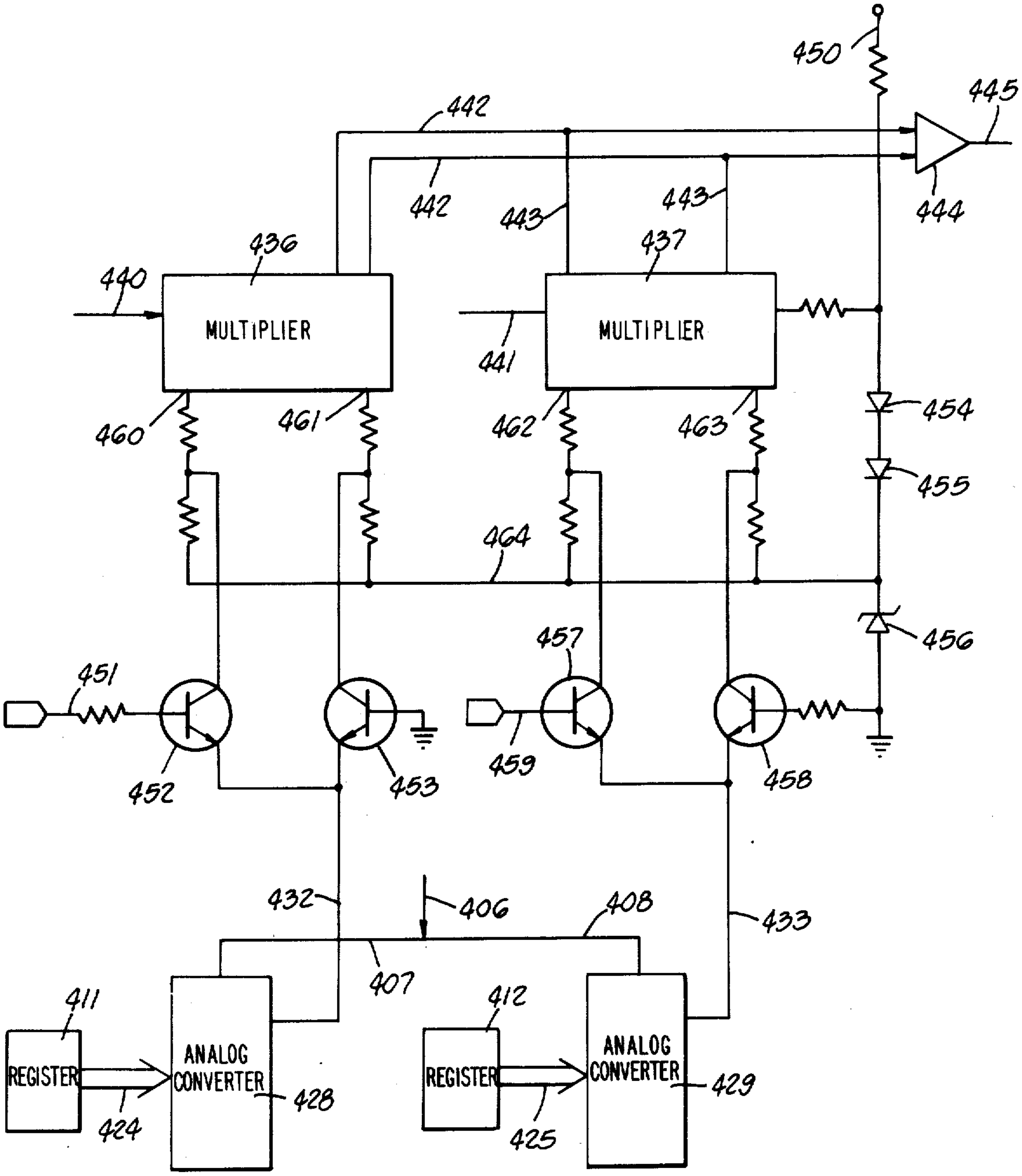
FIG. 5 shows, partly in functional block diagram circuitry for deflecting a character in X-, Y-, and Z-planes and for displaying on a two dimensional device.

FIG. 5 illustrates in part the operation of converters 428 and 429, multipliers 436 and 437, and amplifier 444. Data from registers 411 and 412 are applied via paths 424 and 425, respectively, to multiplying digital to analog converters 428 and 429, respectively. The scale analog signal is applied to both converters 428 and 429 simultaneously via paths 406/407 and 406/408, respectively.

The polarities of the X-deflection and Y-deflection output signals are controlled by digital signals transmitted via paths 451 and 459 respectively, to transistors 452 and 457, respectively. Where the signal on path 451 is high, current flows from source 450, through diodes 454 and 455, path 464, transistor 452, and then to converter 428 via path 432, producing a negative X-deflection analog signal from multiplier 436. If the digital signal applied via line 459 is high, the polarity of the Y-deflection analog signal from multiplier 437 will be negative, because current will flow through transistor 457. If the signal on path 459 is low, the polarity of the Y-deflection analog signal will be positive because current flows through transistor 458 instead of transistor 457. Zener diode 456 limits the voltage on path 464 to a predetermined maximum.

The X-deflection analog signal produced by multiplication of the unmodified X deflection analog signal entering multiplier 436 via path 440 passes along path 442 to amplifier 444. Similarly, the Y-deflection analog signal produced by multiplication of the unmodified Y-deflection analog signal entering multiplier 437 via path 441 passes along path 443 to path 442, is summed with the X-deflection analog signal on lines 442, and the summed, modified X-deflection and modified Y-deflection products pass to amplifier 444, which produces the X-deflection output analog signal. (In the preferred embodiment, the summed, modified X- and Y-deflection analog signals are buffered).

The modified X-deflection output analog signal appearing on path 445 may be expressed as follows.

(Unmodified X-deflection signal, path 440) (First X-modification analog signal, path 432) (Scale analog signal, path 406/407) PLUS (Unmodified Y-deflection signal, path 441) (First Y-modification analog signal, path 433) (Scale analog signal, path 406/408)

The modified Y-deflection output analog signal may be expressed similarly.

Figure 6:
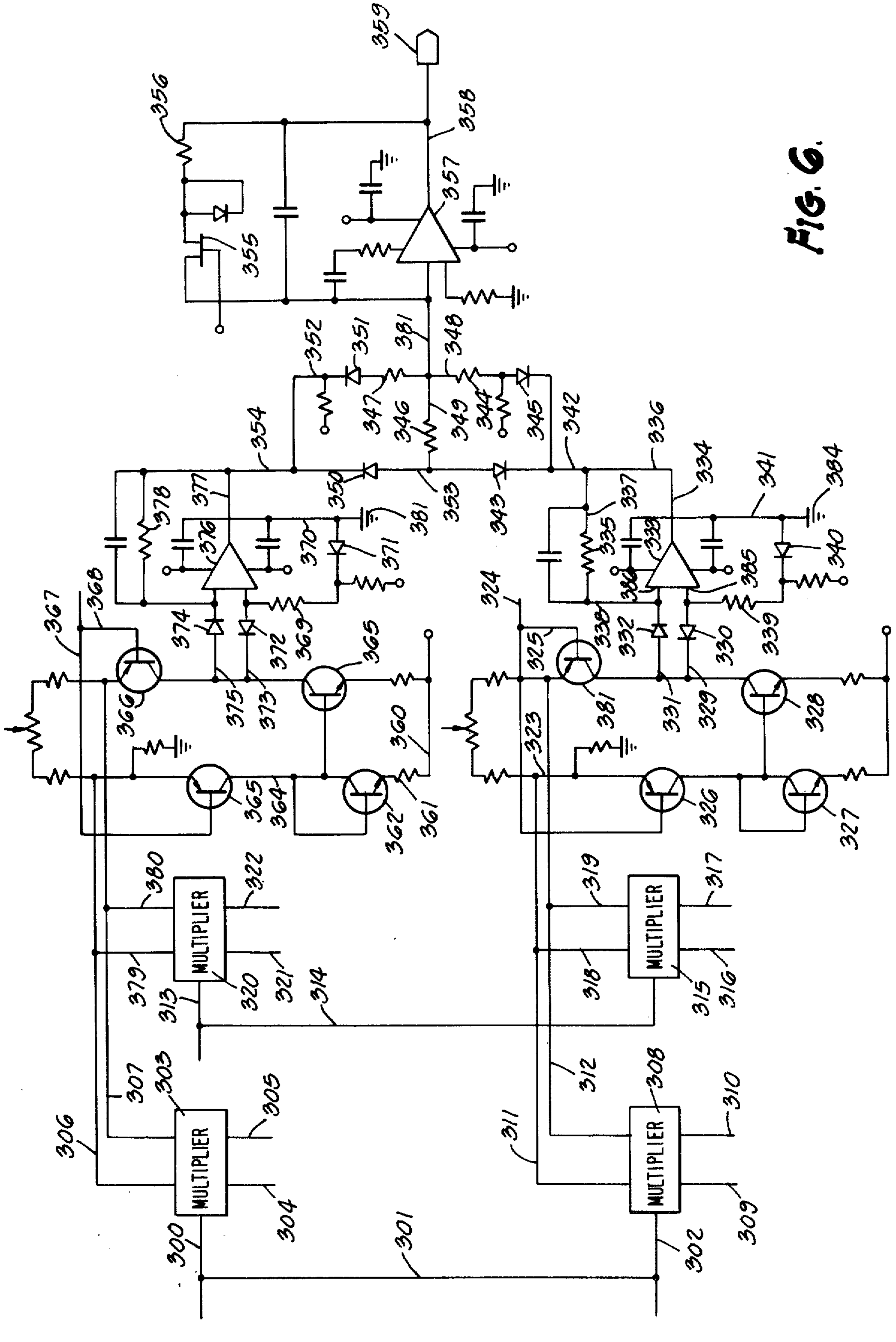
FIG. 6 shows circuitry for producing an X-deflection velocity voltage, a Y-deflection velocity voltage, and for producing a signal approximating the root mean square of these two signals.

FIG. 6 shows circuitry for producing an X-deflection velocity voltage, a Y-deflection velocity voltage, and for producing a signal approximating the root mean square of the two. An X-velocity signal, derived from the analog X-slope signal described above, is applied on path 300 to multiplier 303, which multiplies it by analog signals representing the first X-end point/X-slope modifying signal and the scale signal entering multiplier 303 on paths 304 and 305. The modified X-velocity signal appears on paths 306 and 307.

Similarly, the Y-velocity signal, derived from the Y-slope signal described above, is applied to multiplier 320 along path 313. A first Y-end point/Y-slope modifying signal and the scale signal are applied to multiplier 320 on paths 321 and 322. Multiplier 320 multiplies these three signals together, and the product modified Y-velocity signal appears on lines 379 and 380.

These modified X-velocity and Y-velocity signals are summed by tying the signal on path 306 to the signal on path 379, and by tying the signal on path 307 to the signal on path 380. The signal on path 306/379 passes through transistors 365, 362 and 363, which invert the signal. The signal appearing on path 307/380 passes without inversion through transistor 366.

If transistor 366 is conducting more heavily than transistor 363, current flows through diode 374 and path 375 to operational feedback amplifier 376, which causes the output signal from this amplifier appearing on path 377 to go negative. This output feeds back through resistor 378 until the input to the operational amplifier on path 375 returns to its original state. (Because the signal on path 300 is derived from the signal that includes the X-end point of the stroke, the input to amplifier 376 will cease when the X-end point is reached.) The negative output signal appearing on paths 377 and 354 is equal to the absolute magnitude of the sum of the X-velocity signal multiplied by the scale signal and by the first X-end point/X-slope modifying signal plus the Y-velocity signal multiplied by the same scale signal and by the first Y-end point/Y-slope modifying signal.

If transistor 363 conducts more heavily than transistor 366, the differential negative signal flows from ground 381 through diode 371, resistor 369, diode 372 and path 373. This drives pin 382 on amplifier 376 negative, and a corresponding negative signal appears on path 377, which feeds back to pin 383 on amplifier 376 until pin 382 and 383 on amplifier 376 are at the same potential. As before, the negative output signal appearing on path 377 and on path 354 is equal to the absolute magnitude of the sum of the X-velocity signal multiplied by the scale signal and by the first X-end point/X-slope modifying signal plus the Y-velocity signal multiplied by the same scale signal and by the first Y-end point/Y-slope modifying signal.

The Y-deflection velocity voltage is similarly derived. The X-velocity signal entering multiplier 303 on path 300 is also applied to multiplier 308 via paths 301 and 302. The scale signal and a second X-end point/X-slope modifying signal appear on paths 309 and 310. Multiplier 308 multiplies the X-velocity signal by the second X-end point/X-slope modifying signal and by the scale signal, and the product modified X-velocity signal appears on paths 311 and 312.

Similarly, the Y-velocity signal appearing on path 313 also appears on path 314, and is applied to multiplier 315, together with the scale factor and a second Y-end point/Y-slope modifying signal applied to multiplier 315 along paths 316 and 317. Multiplier 315 multiplies the Y-velocity signal by the scale signal and by the second Y-end point/Y-slope modifying signal, and the product modified Y-velocity signal appears on paths 318 and 319. Path 319 is joined to path 311 thus summing the signals on these two paths. Similarly, path 312 is joined to path 319, thus summing the signals on these two paths. The signal appearing on path 311 passes through path 323, transistors 326, 327 and 328, and is inverted by this transistor network. The signal appearing on path 319 passes through transistor 381, and is not inverted. The differential signal resulting, if positive, is applied on path 331 through diode 332 to operational feedback amplifier 333. Because the signal applied on path 331 is positive, the signal appearing on amplifier output path 334 goes negative, and is fed back through paths 334, 336, 337 and resistor 335 until an equilibrium state is again reached. The signal appearing on paths 334 and 336 also appears on path 342 and is applied to the means for producing an X/Y-deflection velocity voltage signal approximating the root mean square of the X-deflection velocity voltage on path 354 and the Y-deflection velocity voltage.

If the differential signal appearing on path 331 is negative, current will flow from ground 384 through diode 340, resistor 339, diode 330, path 329 and transistor 328. This flow drives pin 385 on amplifier 333 negative, and produces a corresponding negative output on path 334, which feeds back along paths 336, 337, including resistor 335, and 338 until pin 386 on amplifier 333 reaches the same potential as pin 385. The signal appearing on path 334 also appears on path 342, and is applied to the means for producing an X/Y deflection velocity voltage signal approximating the root mean square of the X-deflection velocity voltage on path 354 and the Y-deflection velocity voltage.

The means for producing a signal proportional to the root mean square of the X-deflection velocity voltage and Y-deflection velocity voltage effectively adds the larger of these two signals to one third of the smaller. In the preferred embodiment, resistors 344 and 347 have the same resistance, and resistor 346 on path 349 has a resistance that is half the resistance of 347. Thus, if the signal appearing on path 354 is larger than the signal appearing on path 342, current will flow through both resistors 346 and 347, and through diodes 350 and 351 in paths 353 and 352, respectively. The signal applied on path 381 to operational amplifier 357 will then be proportional to the signal on path 354 and one third of the signal on path 342, and a signal proportional thereto will appear on path 358, which is joined through pin 359 to the display device.

What is claimed is:

1. A stroke signal generating system comprising:

means for generating an analog signal representing the X-end point of a stroke;

means for generating an analog signal representing the Y-end point of said stroke;

means for generating an X-slope analog signal and means for generating a Y-slope analog signal that are separate from the means for generating X-end point and Y-end point analog signals representing the slope of said stroke; and means for integrating said analog signals to produce a stroke signal from a predetermined starting point to said X- and Y-end points wherein the slope signals control the direction and velocity of said stroke signal.

2. A stroke signal generating system comprising:

means for generating an analog signal representing the X-end point of a stroke;

means for generating an analog signal representing the Y-end point of said stroke;

means for utilizing the Y-end point analog signal to produce a Y-deflection analog signal;

means for utilizing the X-end point analog signal to produce an X-deflection analog signal;

means for utilizing said X-deflection analog signal to terminate integration;

means for utilizing said Y-deflection analog signal to terminate integration;

means for generating an X-slope analog signal and means for generating a Y-slope analog signal that are separate from the means for generating X-end point and Y-end point analog signals representing the slope of said stroke; and means for integrating said analog signal to produce said stroke signal.

3. A stroke signal generating system including:

(a) means for generating an X-end point analog signal, means for generating a Y-end point analog signal, means for generating an X-slope analog signal and means for generating a Y-slope analog signal that are separate from the means for generating X-end point and Y-end point analog signals representing representing the slope of said stroke; means for integrating said analog signals to produce said stroke signal; and (b) memory means for storing character strokes in coded form including:

means for storing a plurality of address words, each representing the memory address of means for storing at least one character word group, each character word group defining at least part of one character, each word in said character word group defining one stroke in said character part, said memory means including means permitting sequential accessing of character word groups comprising each character, each address word including in coded form a field specifying whether the number of character word groups sequentially addressed is one or more than one.

4. The memory means of claim 3 wherein each address word includes a field specifying whether movement to another character space follows the character word group addressed.

5. The memory means of claim 3 wherein each address word includes in coded form a field specifying the positioning of the character space on a display device.

6. The memory means of claim 4 wherein each address word includes a field specifying whether the character size is normal or reduced, and where reduced, whether the character is in a normal, subscript or superscript position.

7. The memory means of claim 6 wherein the address word includes a field specifying whether character size changes, whether the character position changes, or both.

8. A stroke signal generating system including:

(a) means for generating an X-end point analog signal, means for generating a Y-end point analog signal, means for generating an X-slope analog signal and means for generating a Y-slope analog signal that are separate from the means for generating X-end point and Y-end point analog signals representing the slope of said stroke; means for integrating said analog signals to produce said stroke signal; and (b) memory means for storing a plurality of word groups, each word group representing at least part of at least one character, each word representing one stroke in said at least one character, said memory means including means for storing fields representing, for the stroke signal each word represents, the X-end point, the Y-end point, the slope, the blanking or unblanking, and, where slope changes during generation of the stroke signal the word represents, a pause in signal output.

9. The memory means of claim 8 wherein said pause is sufficiently long to permit formation of a distinct corner on a display device displaying the stroke said word group represents.

10. The memory means of claim 8 further including a plurality of character word groups that form part of at least two different characters.

11. The memory means of claim 8 further including means for sequentially selecting a combination of word groups to form a single character.

12. The memory means of claim 8 further comprising means for storing a plurality of address words, each address word representing the memory address of means for storing at least one of said character word groups, each address word including in coded form a field specifying whether the number of character word groups sequentially addressed to form the character desired is one or more than one.

13. In a system for generating stroke signals for display on a two dimensional display means, means for moving said stroke segment in the X-, Y- and Z- coordinate system comprising means for generating analog signals specifying the X-end point/X-slope and Y-end point/Y-slope of each stroke signal in X- and Y- coordinate system, wherein the means for generating the X-slope analog signal and the Y-slope analog signal are separate from the means for generating the X-end point and Y-end point signals;

means for generating at least one digital signal signal for modifying the X-end point/X-slope signal and at least one digital signal for modifying the Y-end point/Y-slope analog signal;

means for converting said modifying signals from digital to analog;

means for multiplying said X-end point/X-slope analog signal with one of said X-end point/X-slope modifying-analog signals, means for multiplying said Y-end point/Y-slope analog signals, and means for summing the resulting X- and Y-product analog signals; and means for multiplying said X-end point/X-slope analog signal with another of said X-end point/X-slope modifying analog signals, means for multiplying said Y-end point/Y-slope analog signal with another of said Y-end point/Y-slope modifying analog signals, and means for summing the resulting X- and Y-product analog signals.

14. The system of claim 13 wherein said modifying signal generating means generates two different digital signals for modifying the X-end point/X-slope signal and two different signals for modifying the Y-end point/Y-slope analog signals.

15. The system of claim 13 further comprising separate register means for receiving and transmitting one each of said modifying digital signals.

16. The system of claim 13 further comprising means for generating digital signals representing, respectively, the polarity of each of the modifying signals, and means for applying said polarity digital signals to the corresponding multiplying means.

17. The system of claim 13 further comprising means for generating digital signals representing the scale of the X-end point/X-slope and Y-end point/Y-slope portions of each stroke signal, and means for applying said scale signal to each X-end point/X-slope and Y-end point/Y-slope signal.

18. Means for deriving an X-deflection velocity voltage or a Y-deflection velocity voltage including: means for deriving an analog X-velocity signal from digital data defining the X-slope of a stroke to appear on the display device, means for deriving an analog Y-velocity signal from digital data defining the Y-slope of the same stroke; means for multiplying the analog X-velocity signal by a first X-end point/X-slope modifying signal and by an analog scale signal to produce a modified X-velocity signal wherein the means for generating the X-slope analog signal and the Y-slope analog signal are separate from the means for generating the X-end point and Y-end point signals; means for producing the sum of the analog modified X-velocity signal and the analog modified Y-velocity signal; and means for producing the absolute magnitude of this sum.

19. A stroke signal generating system including means for generating an X-slope analog signal and means for generating a Y-slope analog signal that are separate from the means for generating X-end point and Y-end point analog signals representing the slope of said stroke;

means for integrating said analog signal to produce said stroke signal; and memory means for storing character strokes in coded form including: means for storing a plurality of command words, each command word including at least one field representing the command, and one field controlling the enabling of the command field.

20. The memory means of claim 19 wherein the command field specifies whether the character size is normal or reduced, and, where reduced, whether the character is in a normal, subscript or superscript position.

21. The memory means of claim 20 wherein the field controlling enabling is a single-bit field, and the command field is a two-bit field.

* * * * *